United States Patent
Kumar et al.

(10) Patent No.: US 12,200,562 B2
(45) Date of Patent: Jan. 14, 2025

(54) JOINT CELL SELECTION FOR DUAL SUBSCRIPTION DUAL ACTIVE (DSDA) OPERATION

(71) Applicant: QUALCOMM INCORPORATED, San Diego, CA (US)

(72) Inventors: Akash Kumar, Hyderabad (IN); Raveesh Juneja, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 17/724,205

(22) Filed: Apr. 19, 2022

(65) Prior Publication Data

US 2023/0337097 A1   Oct. 19, 2023

(51) Int. Cl.
*H04W 36/30* (2009.01)
*H04B 17/318* (2015.01)
*H04W 36/00* (2009.01)
H04W 88/06 (2009.01)

(52) U.S. Cl.
CPC .......... *H04W 36/30* (2013.01); *H04B 17/318* (2015.01); *H04W 36/0085* (2018.08); *H04W 88/06* (2013.01)

(58) Field of Classification Search
CPC . H04W 36/30; H04W 36/0085; H04W 88/06; H04W 52/0245; H04B 17/318
See application file for complete search history.

(56) References Cited

U.S. PATENT DOCUMENTS

| | | |
|---|---|---|
| 8,848,688 B1 * | 9/2014 | Wurtenberger ............... H04W 36/00837 370/351 |
| 2017/0127305 A1 * | 5/2017 | Dev ............ H04W 24/10 |
| 2020/0059868 A1 | 2/2020 | Yang et al. |
| 2022/0053607 A1 * | 2/2022 | Rice ............ H04W 72/569 |
| 2022/0061060 A1 * | 2/2022 | Tiri ............ H04W 4/70 |
| 2023/0217340 A1 * | 7/2023 | Sevindik ............ H04W 36/32 370/331 |

FOREIGN PATENT DOCUMENTS

| | | |
|---|---|---|
| WO | 2021119469 A1 | 6/2021 |
| WO | 2021237399 A1 | 12/2021 |
| WO | 2022047450 A1 | 3/2022 |

OTHER PUBLICATIONS

International Search Report and Written Opinion—PCT/US2023/017238—ISA/EPO—Jul. 13, 2023.

* cited by examiner

*Primary Examiner* — Rebecca E Song
*Assistant Examiner* — Mohammod Minhajul Islam
(74) *Attorney, Agent, or Firm* — Haynes and Boone, LLP

(57) ABSTRACT

A method of wireless communication performed by a user equipment (UE) may include: performing, for a first subscription, a first handover from a first cell to a second cell; and performing, for a second subscription, a second handover from a third cell to a fourth cell. In some aspects, at least one of the performing the first handover or the performing the second handover is based on: a difference in signal strength between the first cell and the third cell exceeding a first threshold; and a difference in signal strength between the second cell and the fourth cell being equal to or less than the first threshold.

30 Claims, 10 Drawing Sheets

JOINT CELL SELECTION FOR DUAL SUBSCRIPTION DUAL ACTIVE (DSDA) OPERATION

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: performing, for a first subscription, a first handover from a first cell to a second cell; and performing, for a second subscription, a second handover from a third cell to a fourth cell, wherein at least one of the performing the first handover or the performing the second handover is based on: a difference in signal strength between the first cell and the third cell exceeding a first threshold; and a difference in signal strength between the second cell and the fourth cell being equal to or less than the first threshold.

According to another aspect of the present disclosure, a user equipment (UE) includes: a processor; and a transceiver in communication with the processor, wherein the UE is configured to: perform, for a first subscription, a first handover from a first cell to a second cell; and perform, for a second subscription, a second handover from a third cell to a fourth cell, wherein the UE is configured to perform at least one of the first handover or the second handover based on: a difference in signal strength between the first cell and the third cell exceeding a first threshold; and a difference in signal strength between the second cell and the fourth cell being equal to or less than the first threshold.

According to another aspect of the present disclosure, a non-transitory, computer-readable medium has program code recorded thereon, where the program code comprises instructions executable by a processor of a user equipment (UE) to cause the UE to: perform, for a first subscription, a first handover from a first cell to a second cell; and perform, for a second subscription, a second handover from a third cell to a fourth cell, wherein the instructions configured to cause the UE to perform at least one of the first handover or the second handover are based on: a difference in signal strength between the first cell and the third cell exceeding a first threshold; and a difference in signal strength between the second cell and the fourth cell being equal to or less than the first threshold.

According to another aspect of the present disclosure, a user equipment (UE) includes: means for performing, for a first subscription, a first handover from a first cell to a second cell; and means for performing, for a second subscription, a second handover from a third cell to a fourth cell, wherein at least one of the means for performing the first handover or the means for performing the second handover is based on: a difference in signal strength between the first cell and the third cell exceeding a first threshold; and a difference in signal strength between the second cell and the fourth cell being equal to or less than the first threshold.

Other aspects, features, and examples will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1A:
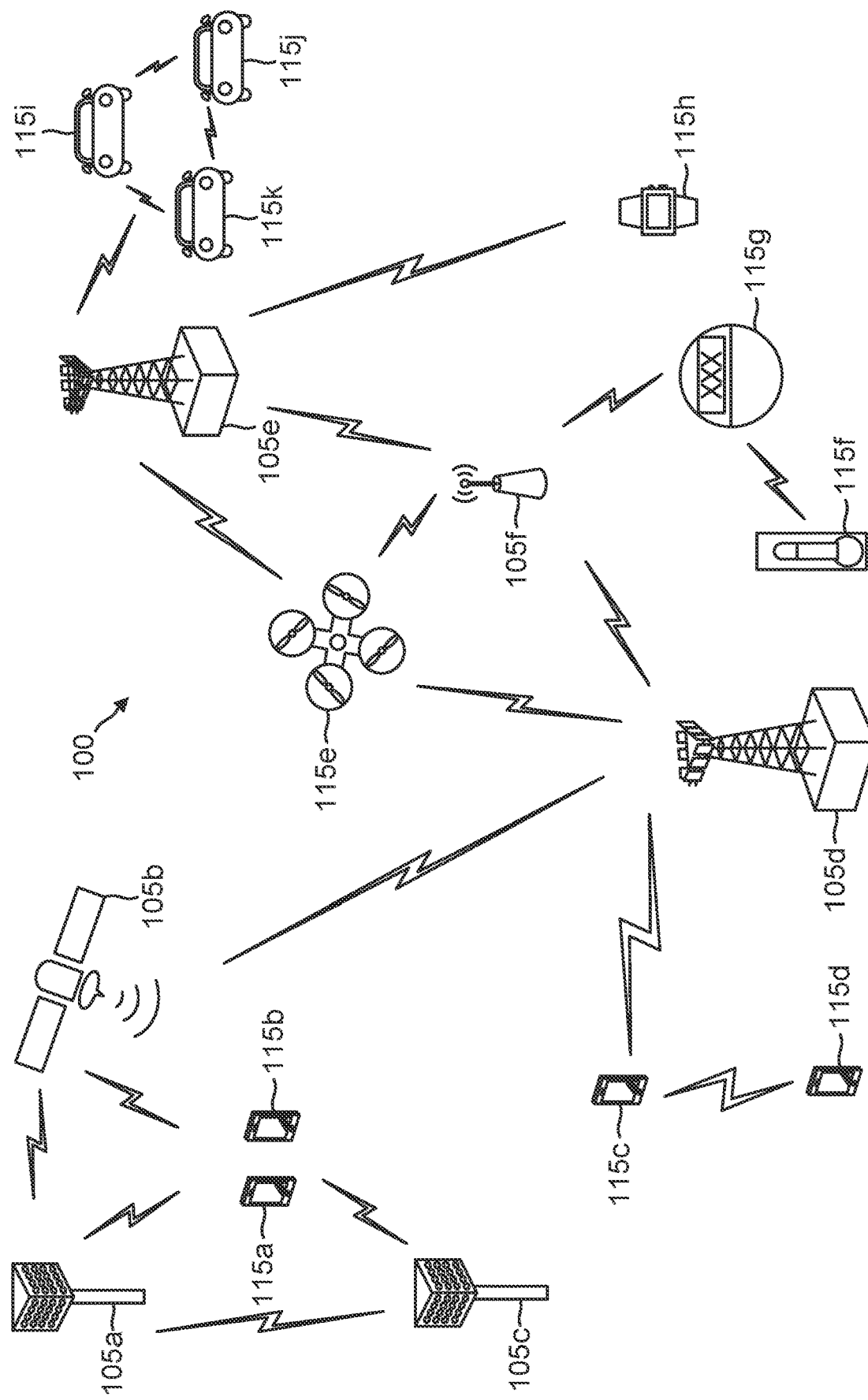
FIG. 1A illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier PUMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (Multi-SIM) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

For a multi-SIM device, one of the SIMs/subscriptions carries the internet data traffic, and it is referred to as the default data subscription (DDS). In some aspects, the DDS may be used for voice, and the other subscription—nDDS—may be used for other uses, such as eMBB, video streaming, online gaming, etc. The user may choose which subscription is the DDS, and the user may change the DDS through a user interface (UI) of the UE. For a multi-SIM device in DSDS mode, there may be periodic sharing of the UE's radio frequency (RF) resources between the two subscriptions for signal reception on one subscription and decoding pages and performing measurements in idle mode on the other subscription. Such periodic sharing may result in undesirable block error rate (BLER) in some instances, as described below.

A UE operating in DSDA mode may have separate hardware (HW) receiving and/or transmitting resources for each subscription/SIM. By using separate HW resources, the UE may continue to operate in a 4×4 multiple-input multiple-output (MIMO) mode to maintain throughput and performance. However, the replication of HW resources for each Rx/Tx chain may undesirably increase the cost of manufacturing and the complexity of the device. Another DSDA option may include sharing HW resources between the subscriptions and downgrading to a 2×2 MIMO mode when DSDA mode is activated. However, this may decrease the throughput and/or performance of the device, which may undesirably degrade the user experience.

In one implementation, a portion of the HW resources may be shared between subscriptions, while a portion of the HW resources may be replicated for each Rx/Tx processing chain. For example, a UE may be configured with 4 antenna ports. Each antenna port may be associated with a respective external low-noise amplifier (eLNA). For the purposes of the present disclosure, it will be understood that the eLNA may not necessarily be external to the transceiver circuit. For example, in some aspects, each antenna portion may be associated with an internal LNA that is shared between subscriptions. The HW resources may split the signal after eLNA amplification and provide for independent baseband filters, internal LNA, and/or phase locked loop (PLL) control for each subscription. This implementation may mitigate the increased manufacturing costs while allowing for 4×4 MIMO operation in DSDA. However, because each information stream or antenna port is associated with only one eLNA, the Rx processing of the information stream for each subscription may be performed with a single eLNA gain state. However, in DSDA operation, each antenna port may receive communications from two different cells. Accordingly, the signal strength of the signals for a first subscription may be different from the signal strength of a second subscription. In some aspects, the eLNA gain state may be optimal or suitable for the first subscription (e.g., DDS) but not for the second subscription (e.g., nDDS). For example, the eLNA gain state may cause the receive signals for the second subscription to be either insufficiently amplified, or may lead to saturation. This may result in increased BLER and latency and degrade user performance.

The present disclosure describes schemes, mechanisms, and devices for joint cell selection in co-banded MSIM DSDA operation. For example, aspects of the present disclosure include performing a cell selection procedure to select a pair of cells whose signal strength is within a range that can be processed using a single eLNA gain state. For example, a UE may be configured for dual sim operation, such as DSDA as described above. The UE may include an array of antennas associated with one or more antenna ports. In an exemplary aspects, the UE may be associated with four antenna ports. Further, the UE may be configured for MIMO operation. In one example, the UE may include 4 antenna ports, and may be configured for 4×4 MIMO operation. In some aspects, upon initiating DSDA mode, the UE may check the signal strength for the cells associated with each subscription, the current eLNA gain state, and/or its respective switch point. The UE may also determine whether an optimal eLNA gain state for each subscription is different. Further, the UE may determine a signal strength range of an optimal eLNA gain state for at least one of the subscriptions. If the signal strength for the primary subscription is above a configurable threshold, the UE may search for other cells for the primary sub having a signal strength that is lower than the current primary subscription's cell by at least the signal strength range described above. Accordingly, although the signal strength of the primary subscription may be lower with the newly selected cell, the selected cells of both subscriptions may have signal strengths that are within the eLNA gain state signal strength range described above.

The mechanisms and aspects described herein provide several advantages. For example, the joint cell selection for DSDA operation allows for a higher-throughput 4×4 MIMO operation running in DSDA mode providing higher throughput and performance while mitigating the materials/manufacturing costs. Further, the devices and mechanisms described herein afford limited or negligible practical impact on network performance as the signal strength for both of the jointly-selected cells of the subscriptions may have acceptable signal strength and/or signal-to-noise ratio (SNR) conditions such that BLER is maintained at a low level. Accordingly, DSDA operation is allowed while maintaining the high data transfer rates from MIMO operation, which provides a better overall user experience.

FIG. 1A illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1A, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1A, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple SIMs and may operate so that one SIM is in an active mode and the other SIM is in an idle mode (e.g., DSDS mode). In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM.

Figure 1B:
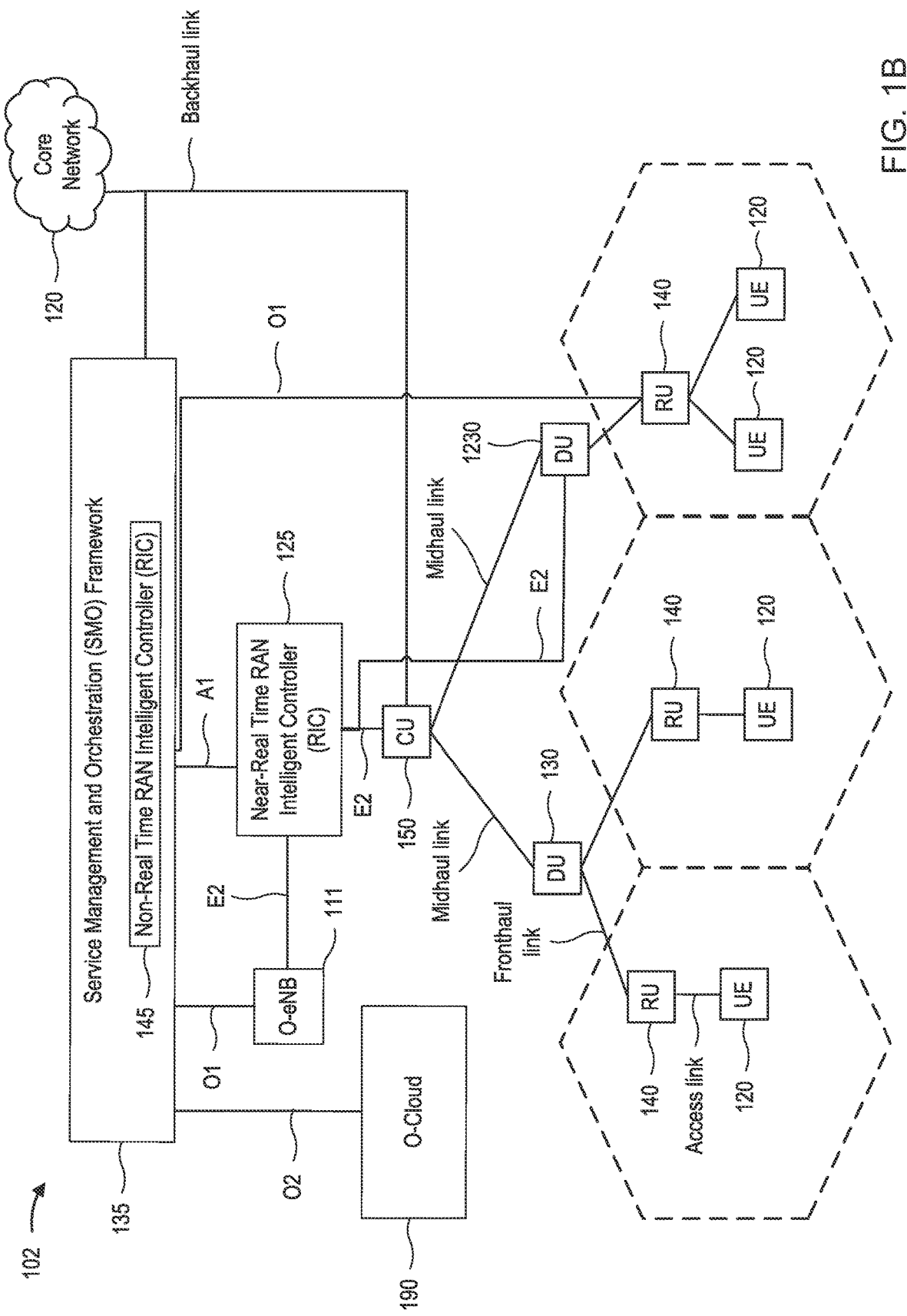
FIG. 1B is a diagram illustrating an example disaggregated BS architecture according to some aspects of the present disclosure.

FIG. 1B shows a diagram illustrating an example disaggregated base station 102 architecture. The disaggregated base station 102 architecture may include one or more central units (CUs) 150 that can communicate directly with a core network 120 via a backhaul link, or indirectly with the core network 100 through one or more disaggregated base station units (such as a Near-Real Time (Near-RT) RAN Intelligent Controller (RIC) 125 via an E2 link, or a Non-Real Time (Non-RT) RIC 145 associated with a Service Management and Orchestration (SMO) Framework 135, or both). A CU 150 may communicate with one or more distributed units (DUs) 130 via respective midhaul links, such as an F1 interface. The DUs 130 may communicate with one or more radio units (RUs) 140 via respective fronthaul links. The RUs 140 may communicate with respective UEs 120 via one or more radio frequency (RF) access links. In some implementations, the UE 120 may be simultaneously served by multiple RUs 140.

Each of the units, i.e., the CUs 150, the DUs 130, the RUs 140, as well as the Near-RT RICs 125, the Non-RT RICs 145 and the SMO Framework 135, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 150 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 150. The CU 150 may be configured to handle user plane functionality (i.e., Central Unit—User Plane (CU-UP)), control plane functionality (i.e., Central Unit—Control Plane (CU-CP)), or a combination thereof. In some implementations, the CU 150 can be logically split into one or more CU-UP units and one or more CU-CP units. The CU-UP unit can communicate bidirectionally with the CU-CP unit via an interface, such as the E1 interface when implemented in an O-RAN configuration. The CU 150 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 130 may further host one or more low PHY layers. Each layer (or module) can be implemented with an interface configured to communicate signals with other layers (and modules) hosted by the DU 130, or with the control functions hosted by the CU 150.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 120. In some implementations, real-time and non-real-time aspects of control and user plane communication with the RU(s) 140 can be controlled by the corresponding DU 130. In some scenarios, this configuration can enable the DU(s) 130 and the CU 150 to be implemented in a cloud-based RAN architecture, such as a vRAN architecture.

The SMO Framework 135 may be configured to support RAN deployment and provisioning of non-virtualized and virtualized network elements. For non-virtualized network elements, the SMO Framework 135 may be configured to support the deployment of dedicated physical resources for RAN coverage requirements which may be managed via an operations and maintenance interface (such as an O1 interface). For virtualized network elements, the SMO Framework 135 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 150, DUs 130, RUs 140 and Near-RT RICs 125. In some implementations, the SMO Framework 135 can communicate with a hardware aspect of a 4G RAN, such as an open eNB (O-eNB) 111, via an O1 interface. Additionally, in some implementations, the SMO Framework 135 can communicate directly with one or more RUs 140 via an O1 interface. The SMO Framework 135 also may include a Non-RT RIC 145 configured to support functionality of the SMO Framework 135.

The Non-RT RIC 145 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 145 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 150, one or more DUs 130, or both, as well as an O-eNB, with the Near-RT RIC 125.

In some implementations, to generate AI/ML models to be deployed in the Near-RT RIC 125, the Non-RT RIC 145 may receive parameters or e14ternal enrichment information from external servers. Such information may be utilized by the Near-RT RIC 125 and may be received at the SMO Framework 135 or the Non-RT RIC 145 from non-network data sources or from network functions. In some examples, the Non-RT RIC 145 or the Near-RT RIC 125 may be configured to tune RAN behavior or performance. For e14ample, the Non-RT RIC 145 may monitor long-term trends and patterns for performance and employ AI/ML models to perform corrective actions through the SMO Framework 135 (such as reconfiguration via O1) or via creation of RAN management policies (such as A1 policies).

Figure 2:
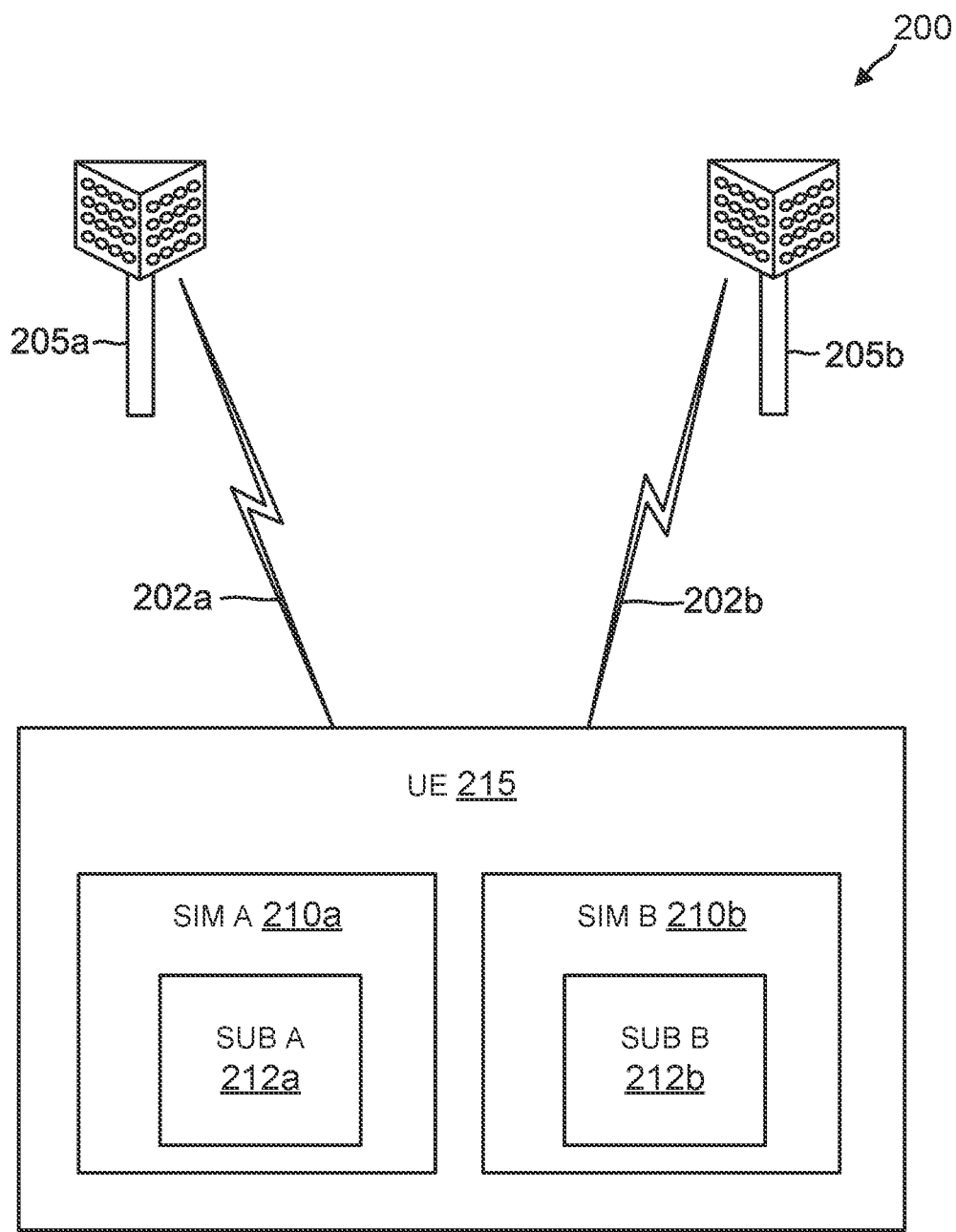
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210a and SIM B 210b), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SIM B 210b may store information for accessing a network of the second operator based on the second subscription 212b. In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain at the UE 215 for communications with corresponding network(s).

In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

In some aspects, the radio link 202a between the UE 215 and the BS 205a and the radio link 202b between the UE 215 and the BS 205b may be over orthogonal bands such as FR1/FR2 or low band/high band FR1 Of course, any combination of radio links 202 is possible, and the radio links may even take place using different radio access technologies. For instance, radio link 202a may carry communications according to 5G protocols, whereas radio link 202b may carry communications according to LTE protocols.

Figure 3:
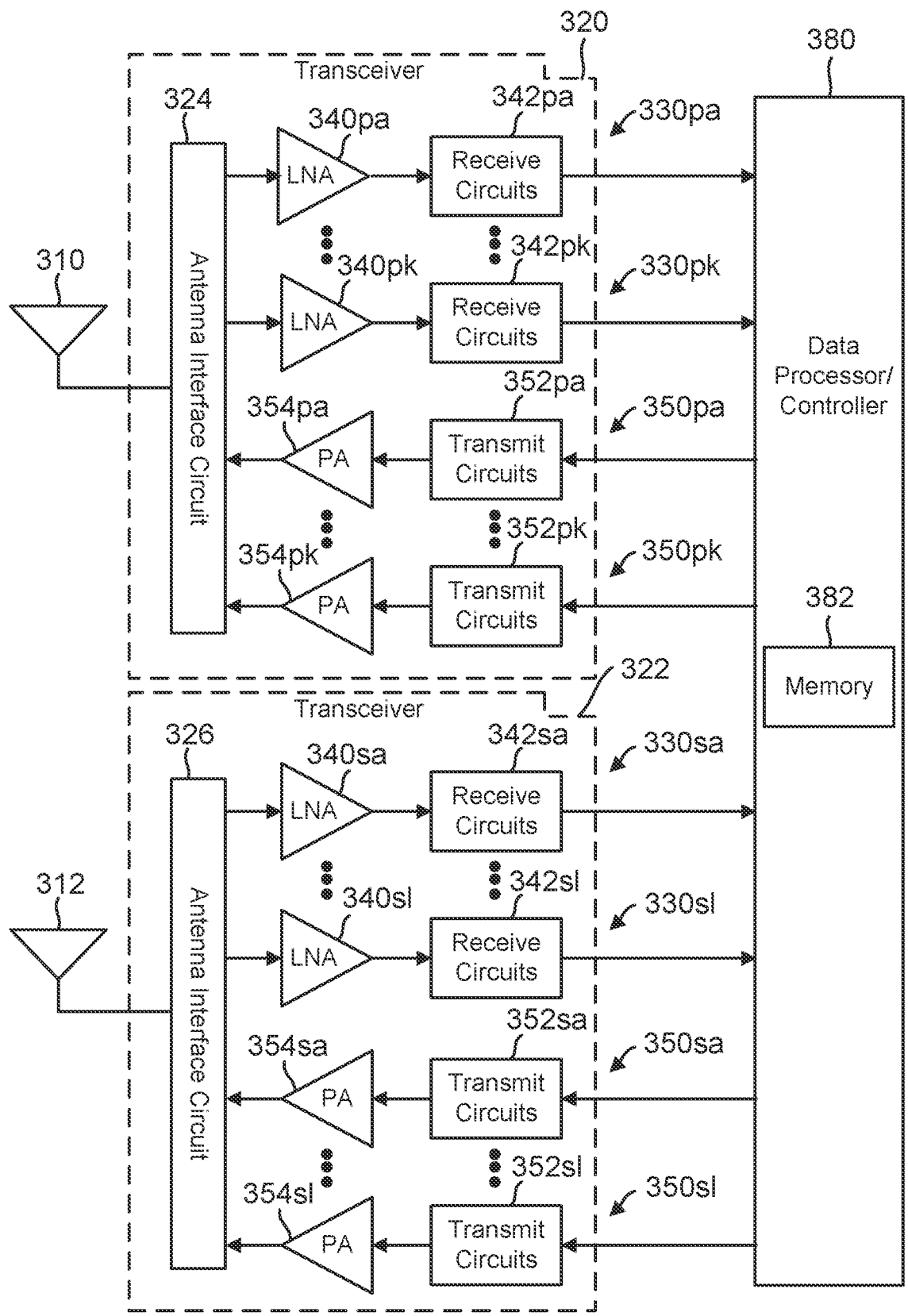
FIG. 3 is a block diagram of a hardware architecture of a UE, such as the UEs of FIGS. 1-2, according to some aspects of the present disclosure.
Figure 7:
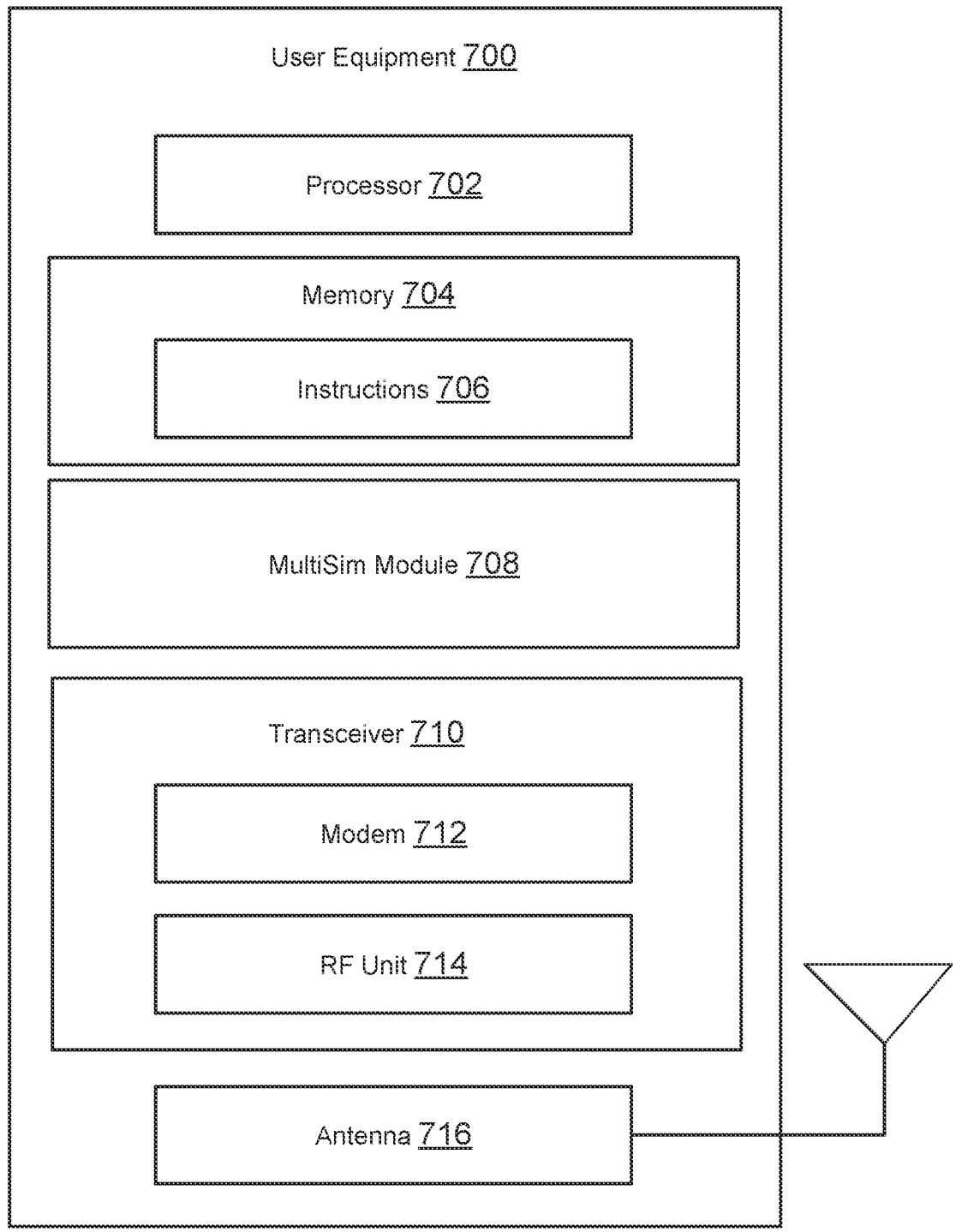
FIG. 7 illustrates a block diagram of a user equipment (UE) according to some aspects of the present disclosure.

FIG. 3 illustrates an example hardware architecture for RF chains. The example hardware may be implemented within UE 115 (FIG. 1), UE 215 (FIG. 2), or UE 700 (FIG. 7). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330s1 and L transmitters 350sa to 350s1 to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal. The RF signal may be routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver, though the described operations apply equally well to any of the other receivers 330. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380.

Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter, though the described operations apply equally well to any of the other transmitters 350. Within transmitter 350pa, transmit circuits 352pa amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs, RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

Controller 380 may be in communication with one or more SIMs to provide DSDA operation in which one SIM may be transmitting and receiving data, while the other SIM may be in idle mode. The controller 380 may execute software logic that assigns one of the transceivers 320, 322 to a particular SIM and the other one of the transceivers to the other SIM in a dual SIM implementation. In another example, the controller 380 may assign both transceivers 320, 322 to both SIMs, thereby allowing both SIMs to employ multi-antenna operations, such as beam forming and the like. In one example implementation, one of the SIMs is active, whereas the other SIM is in idle mode.

In one example, a first SIM (e.g., the DDS) may use the receiving portions of either or both of the transceivers 320, 322 to receive SSBs, TRSs, application data, and the like. However, the other SIM (e.g., the nDDS in idle mode) may periodically receive paging signals from its network. In doing so, the idle-mode SIM may use RF resources (e.g., antennas 310, 312, interface circuits 324, 326, and various filters, mixers, oscillators, and processing circuits not shown) and require an antenna switch circuit (e.g., in interface circuits 324, 326) to create an RF receive path for the idle mode SIM. Once the idle-mode SIM has completed its page operation, then the antenna switching circuit may then uncoupled the RF receive path to the idle-mode SIM. Both creating the RF receive path and uncoupling the RF receive path includes a switching operation in which a physical circuit is closed or opened, respectively, and the switching operation may result in a brief amount of time in which impedance at the antenna elements 310, 312 are unmatched, thereby perhaps causing DL reception interference at the active-mode SIM. Accordingly, the data processor 380 may execute computer code to provide functionality to select times for the switching operations that either do not create DL reception interference or cause a lesser amount of DL reception interference.

Figure 4:
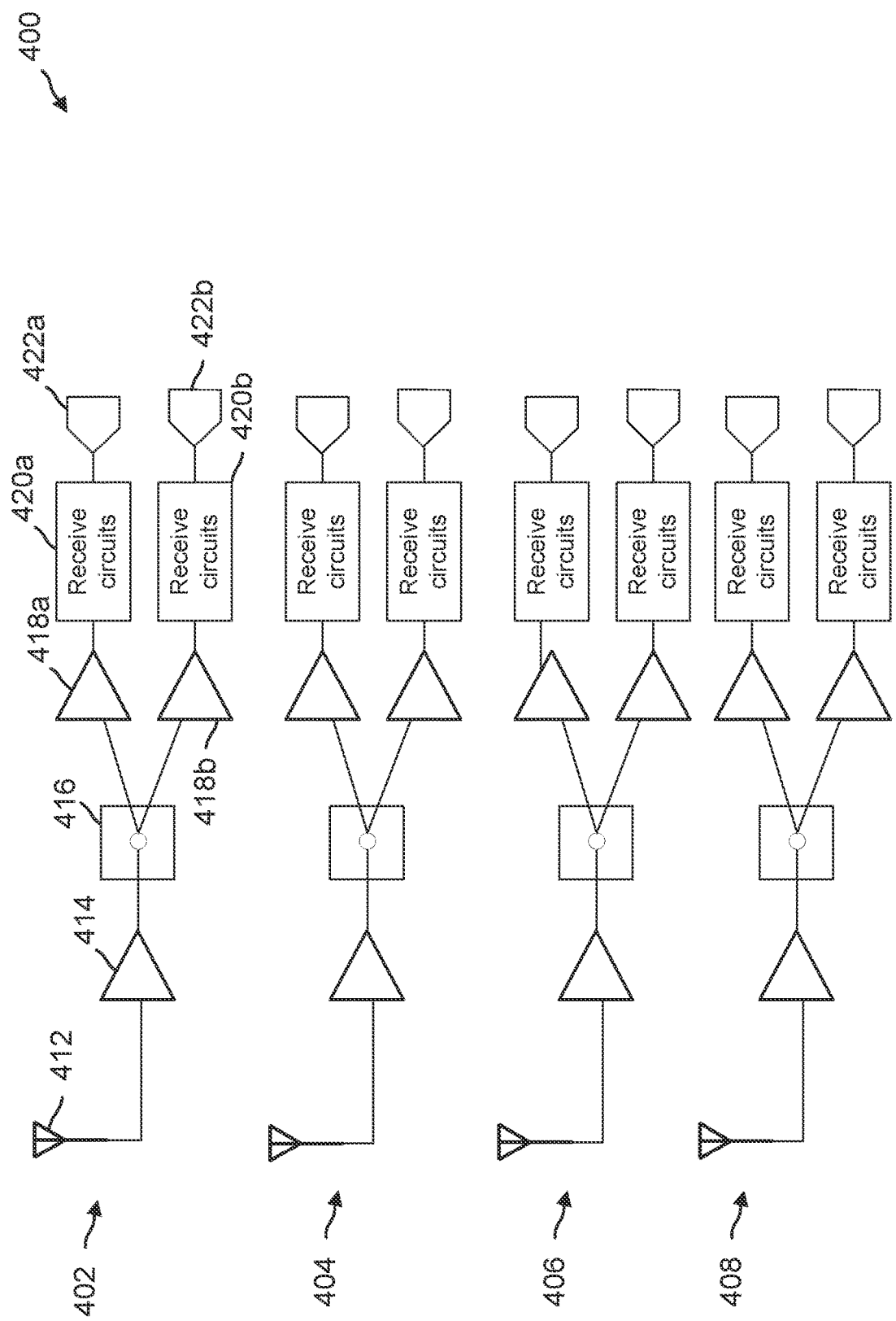
FIG. 4 is a block diagram of a hardware architecture of a UE having a shared external low-noise amplifier (eLNA) for each of a plurality of antenna ports, according to some aspects of the present disclosure.

FIG. 4 illustrates another example hardware architecture for RF chains. The RF chains may be implemented within UE 115 (FIG. 1), UE 215 (FIG. 2), or UE 700 (FIG. 7). The architecture shown in FIG. 4 may be similar to the architecture shown in FIG. 3, in some aspects. In this exemplary design, the hardware architecture includes, for each antenna, an external LNA (eLNA), and a signal split for splitting signals from each eLNA into two receive processing chains. Each Rx processing chain may be associated with one subscription in a MSIM communication scheme. Further, in some aspects, the hardware architecture may be used for receive processing and/or transmission.

In the architecture 400, each chain 402, 404, 406, 408 may include an antenna 412 in communication with an eLNA. Although shown as an antenna or antenna element, it will be understood that each antenna 412 may represent an antenna port. For example, an antenna port may be associated with one or more antenna elements of an antenna array. Each antenna port may be configured to receive and provide for processing one or more information streams in a MIMO communication scenario. For example, in FIG. 4, each antenna 412 may be configured to receive two information streams from two respective serving cells. Each information stream of each cell may be transmitted by a single network entity (e.g., BS, wireless communication node, RIS, etc.), or from different network entities. For example, each antenna 412 may be configured to receive a first information stream from a first BS on a first cell, and a second information stream from a second BS on a second cell. One of the information streams may be associated with a DDS, while the other information stream may be associated with a n-DDS. In some aspects, the eLNA may not be external. For example, the eLNA 414 may be an internal LNA that is shared between subscriptions.

The eLNA 414 is configured to amplify signals from each antenna or antenna port 412 based on a gain state. In some aspects, the gain state may be configured and updated based on signal strength measurements and/or other feedback from the chain 402. For example, the architecture 400 may include an automatic gain control (AGC) mechanism that uses feedback from one or both of the split Rx chains. In some aspects, the eLNA gain state may be updated to be within an optimal signal strength range to maintain SNR and prevent signal saturation. In some aspects, a UE may be configured to update the eLNA gain state to an optimal or preferred gain state for the Rx signals. However, as explained further below, if the amplified signal from the eLNA gain state is split into information streams associated with two different cells, the eLNA gain state for each information stream may not be the same. In some instances such as during DSDA operation in which multiple information streams are received at each antenna 412, an optimal eLNA gain state for one information stream/subscription may cause insufficient SNR and/or signal saturation for the other information stream/subscription. Aspects of the present disclosure include joint cell selection methods and mechanisms for MSIM devices entering DSDA mode.

Each chain 402, 404, 406, 408, 410 further includes signal split circuitry 416 for splitting and/or duplicating the amplified signal into two Rx processing chains associated with each of the two subscriptions. Each processing chain includes an internal LNA (iLNA) 418a, 418b, receive circuits 420a, 420b, and an analog-to-digital converter (ADC) 422a, 422b. Similar to the eLNA, each iLNA 418 may be independently controlled with an iLNA gain state to accommodate the split signals' difference in signal strength. The receive circuits 420 for each stream may include a baseband filter (BBF) and other circuitry configured to downconvert the output RF signal from the splitter 416 to baseband, amplify and filter the downconverted signal, and provide an analog input signal to the ADC 422. Receive circuits 420 may include mixers, filters, amplifiers, matching circuits, an oscillator, a local oscillator (LO) generator, a phase locked loop (PLL), etc. In some aspects, the receive circuits 420 are configured to provide feedback signals for controlling the gain state of the iLNAs 418. In other aspects, the receive circuits 420 may be configured to provide feedback signals for controlling the gain state of the eLNA 414.

After being digitized by the ADC 422, the signals may be digitally processed by a processing circuit. The processing circuit may be implemented on one or more application specific integrated circuits (ASICs) and/or other ICs. The processing circuit may be in communication with one or more SIMs to provide DSDA operation in which one SIM may be transmitting and receiving data, while the other SIM may be in idle mode. The processing circuit may execute software logic that assigns one of the chains to a particular SIM and the other one of the transceivers to the other SIM in a dual SIM implementation. In another example, the processing circuit may assign to both SIMs, thereby allowing both SIMs to employ multi-antenna operations, such as beam forming and the like.

In some aspects, the architecture 400 may be used in a MSIM UE operating in DSDA mode. Further, the architecture may allow for MIMO operation where each antenna/antenna port 412 may be used both for transmitting and receiving signals for each active subscription. Accordingly, if the UE has 4 antenna ports, as shown in FIG. 4, the UE may be configured for 4×4 MIMO operation in DSDA mode. In other aspects, the UE may be configured with fewer or more antenna ports than shown in FIG. 4, such as 2, 4, 8, 16, etc.

In some aspects, a UE having an architecture similar or identical to the architecture 400 of FIG. 4 may receive signals associated with two subscriptions on at least one antenna port. The signals for each subscription may be associated with different cells and/or with different transmitting wireless communication devices (e.g., different BSs at different locations). In some aspects, each subscription is associated with a different network altogether. For example, while operating in DSDA mode, each antenna port may receive, simultaneously or at different times, signals having different signal strengths and/or SNR. However, each antenna port may have a single AGC mechanism to apply a single eLNA gain state to the signals before they are split into two information streams. In some instances, although an eLNA gain state may be suitable or optimal for one subscription, the eLNA gain state may be unsuitable for the other subscription.

The present disclosure describes schemes, mechanisms, and devices for joint cell selection in co-banded MSIM DSDA operation. For example, aspects of the present disclosure include performing a cell selection procedure to select a pair of cells whose signal strength is within a range that can be processed using a single eLNA gain state. For example, a UE may be configured for dual sim operation, such as DSDA as described above. The UE may include an array of antennas associated with one or more antenna ports. In an exemplary aspects, the UE may be associated with four antenna ports. Further, the UE may be configured for MIMO operation. In one example, the UE may include 4 antenna ports, and may be configured for 4×4 MIMO operation. In some aspects, upon initiating DSDA mode, the UE may check the signal strength for the cells associated with each subscription, the current eLNA gain state, and/or its respective switch point. The UE may also determine whether an optimal eLNA gain state for each subscription is different. Further, the UE may determine a signal strength range of an optimal eLNA gain state for at least one of the subscriptions. If the signal strength for the primary subscription is above a configurable threshold, the UE may search for other cells for the primary sub having a signal strength that is lower than the current primary subscription's cell by at least the signal strength range described above. Accordingly, although the signal strength of the primary subscription may be lower with the newly selected cell, the selected cells of both subscriptions may have signal strengths that are within the eLNA gain state signal strength range described above.

Figure 5:
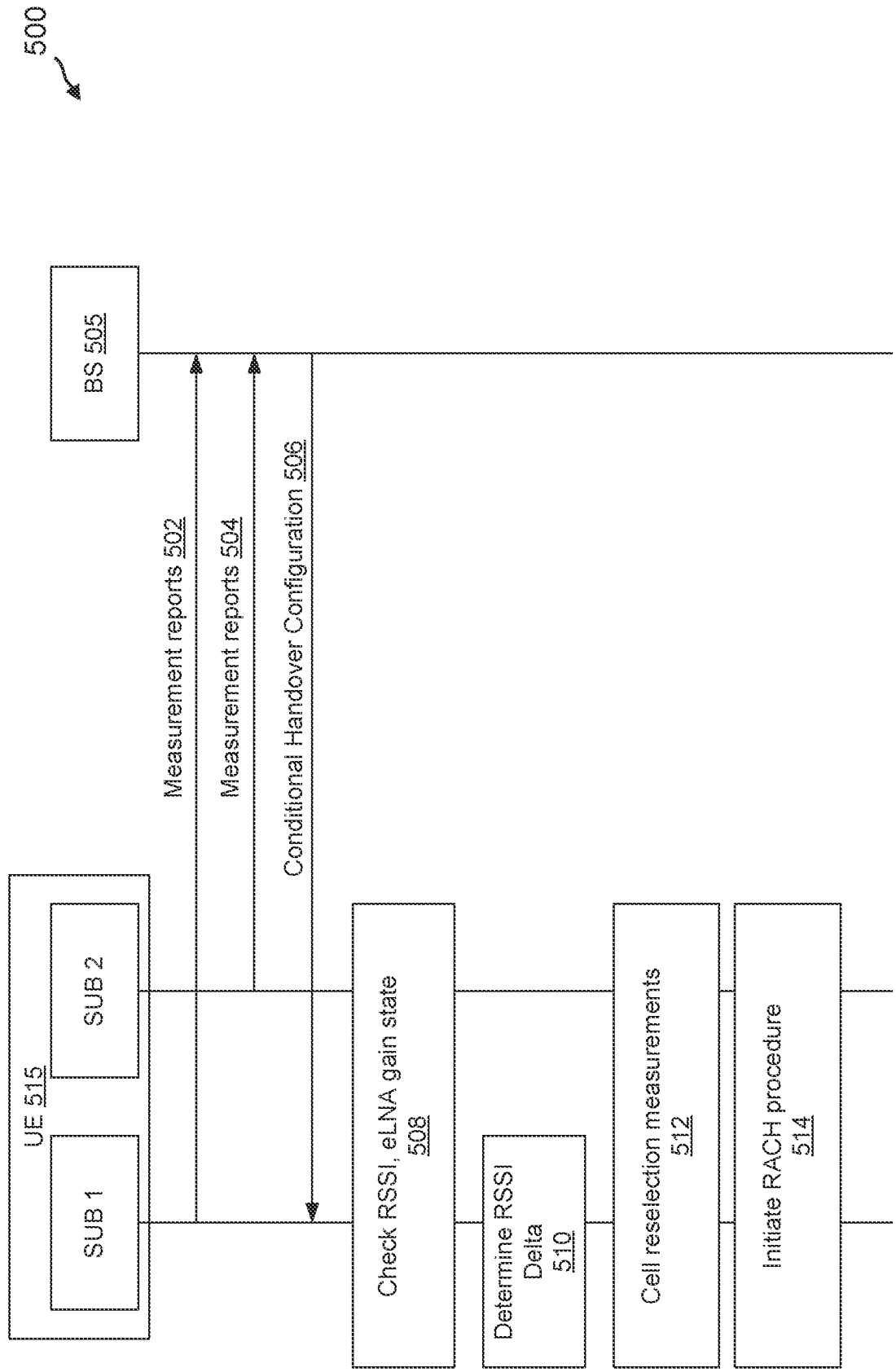
FIG. 5 is a signaling diagram of a method for joint cell selection for dual subscription dual active (DSDA) operation, according to some aspects of the present disclosure.

FIG. 5 is a signaling diagram of a method 500 for MSIM joint cell selection according to aspects of the present disclosure. The method is performed by a UE 515 and a BS 505. The UE 515 is configured for MSIM operation on a first subscription SUB 1 and a second subscription SUB 2. In some aspects, the UE 515 comprises a communication architecture similar to the architecture 400 shown in FIG. 4. In some aspects, the UE 515 includes a plurality of antennas and/or antenna ports configured to maintain simultaneous information streams for MIMO operation. For example, the UE 515 may include two antenna ports configured for 2×2 MIMO operation. In another example, the UE 515 may include four antenna ports configured for 4×4 MIMO operation. In some aspects, the UE 515 may include one or the UEs 115 of the network 100, the UE 215, and/or the UE 700. In some aspects, the BS 505 may be one of the BSs 105 of the network 100, and/or the BS 800 described below. The UE 515 may be configured for DSDA operation such that SUB 1 is configured to communicate with the BS 505 on a first cell, and with a different BS on a different second cell. In some aspects, SUB 1 may communicate with the BS 505 on a first network, and SUB 2 may communicate with a different BS on a different network. In other aspects, SUB 1 and SUB 2 may communicate with a same BS and/or with a same network.

At action 502, the UE 515 transmits one or more first measurement reports associated with SUB 1. In some aspects, the measurement reports may include or indicate signal strength measurements, signal quality measurements, signal-to-noise ratio (SNR), LNA gain state information, and/or any other suitable channel condition information associated with the cell of SUB 1. For example, the measurement report for SUB 1 may include or indicate received signal strength indicator (RSSI), reference signal received power (RSRP), reference signal received quality (RSRQ), signal to interference noise ratio (SINR), and/or any other relevant channel condition indicator. In some aspects, SUB 1 may be referred to as a primary subscription, a default subscription, and/or a DDS.

For the purposes of the present disclosure, signal strength measurements may be illustrated in the accompanying figures as "RSSI." However, it will be understood that the indication of RSSI in the figures is only exemplary and representative of one or more signal strength measurements and/or signal quality measurements, including RSSI, RSRP, RSRQ, and/or SINR.

At action 504, the UE 515 transmits one or more second measurement reports associated with SUB 2. In some aspects, the measurement reports may include or indicate signal strength measurements, signal quality measurements, SNR, LNA gain state information, and/or any other suitable channel condition information associated with the cell of SUB 2. For example, the measurement report for SUB 2 may include or indicate RSSI, RSRP, RSRQ, SINR, and/or any other relevant channel condition indicator. In some aspects, SUB 2 may be referred to as a secondary subscription, a non-default subscription, and/or a n-DDS.

At action 506, the BS 505 transmits, to the UE 515 on SUB 1, a conditional handover (CHO) configuration. In some aspects, the transmission of the CHO configuration is based on an event or trigger. In some aspects, the event or trigger is indicated in the measurement reports communicated at actions 502 and/or 504. The CHO may indicate a plurality of cells two which the UE 515 may perform a handover or cell reselection. In some aspects, action 506 may include transmitting a single CHO configuration indicating candidate cells for SUB 1. In another aspect, action 506 may include transmitting a single CHO configuration indicating candidate cells for both SUB 1 and SUB 2. In another aspect, action 506 may include transmitting a first CHO configuration indicating a first plurality of candidate cells for SUB 1, and a second CHO configuration indicating a second plurality of candidate cells for SUB 2.

At action 508, the UE 515 checks the signal strength for both SUB 1 and SUB 2. Further, the UE 515 may determine the external LNA (eLNA) gain state for one or more of the antenna ports. In some aspects, action 508 includes the UE 515 determining a eLNA gain state switch point. In some aspects, action 508 may include determining whether the signal strength for SUB 1 exceeds a configured threshold. In this regard, if the signal strength for SUB 1 is of a sufficiently high strength or power, the UE 515 may determine whether to perform a handover to a new cell, as explained further below. In some aspects, action 508 may include determining RSSI and/or RSRP. In another aspect, action 508 may include determining RSRP and/or SINR. In some aspects, action 508 further includes determining an optimal eLNA gain state for each of SUB 1 and SUB 2. As explained further below with respect to FIG. 6, if the optimal or preferred eLNA gain state for SUB 1 is different from that of SUB 2, the UE 515 may determine to initiate a cell search and reselection procedure.

At action 510, the UE 515 determines a signal strength delta associated with SUB 1. The signal strength delta may refer to a range of signal strengths associated with the eLNA gain state for SUB 1. In other words, the signal strength delta may indicate a range of signal strength or signal power for which the eLNA gain state of SUB 1 would be optimal or preferred.

At action 512, if the eLNA gain state for SUB 1 is different from the optimal eLNA gain state for SUB 2, and if the signal strength for SUB 1 is equal to or greater than the configured threshold described with respect to action 508, the UE 515 performs signal measurements for a cell reselection. In some aspects, action 512 includes obtaining RSSI, RSRP, RSRQ, and/or SINR for one or more neighboring cells. In the illustrated example, action 512 may include performing the measurements for some or all of the cells indicated in the CHO configuration communicated at action 506.

At action 514, based on the cell reselection measurements obtained at action 512, the UE 515 performs a RACH procedure to connect to a new cell. In some aspects, action 514 includes performing the RACH procedure only for SUB 1. In other aspects, action 514 includes performing the RACH procedure for each of SUB 1 and SUB 2. For example, action 512 may include obtaining cell measurements for a plurality of candidate cells for each of SUB 1 and SUB 2, and selecting a pair of cells suitable for each of SUB 1 and SUB 2. However, in some aspects, the cell reselection criteria for SUB 1, or the primary SUB, may be different from the reselection criteria for SUB 2.

In some aspects, action 514 includes selecting the SUB 1 cell based on the signal strength delta described above. For example, action 514 may include selecting, for SUB 1, a cell having a signal strength that is lower than the signal strength of the current SUB 1 serving cell by an amount equal to or greater than the signal strength delta. However, action 514 may also include selecting the new SUB 1 cell based on a lower-bound or lower threshold. Accordingly, action 514 may include selecting, for SUB 1, a cell having a signal strength that is: (1) lower than the signal strength of the current SUB 1 serving cell by an amount equal to or greater than the signal strength delta; and (2) greater than the lower configured threshold. In some aspects, action 514 may include selecting, for SUB 2, a cell having a signal strength greater than the lower configured threshold, but may not depend on the signal strength delta described above. In other aspects, the cells for both SUB 1 and SUB 2 are selected based on the signal strength delta. Based on the RACH procedure of action 514, the UE 515 may enter an RRC connected state for either or both of SUB 1 and/or SUB 2. Further, the UE 515 may initiate a DSDA mode and commence communications on each of SUB 1 and SUB 2.

It will be understood that one or more modifications may be made to the method 500 without departing from the scope of the present disclosure. For example, in one aspect, the method 500 may not include communicating the CHO, or performing the cell reselection measurements based on the CHO. In some aspects, one or more of the cell reselection determinations made by the UE 515 may be made by the network (e.g., including by the BS 505). For example, in some aspects, based on an event trigger or condition being met, the UE may transmit the SUB 1 and SUB 2 cell measurements and the current eLNA gain state to the network. One or more devices of the network (e.g., the BS 505) may determine, based on the measurements, whether to initiate a cell reselection for SUB 1 and/or SUB 2. In some aspects, the network may determine to initiate the cell reselection as similarly described above. For example, the network may determine to initiate the cell reselection if the signal strength for SUB 1 exceeds a configured threshold, and if the optimal or preferred eLNA gain state for SUB 1 is different from the optimal or preferred eLNA gain state for SUB 2. The network may transmit a measurement configuration to the UE 515 inciting one or more neighboring candidate cells to measure. The UE 515 may make the measurements indicated in the measurement. The UE 515 may then transmit one or more measurement reports to the network for the cells indicated in the measurement configuration. In some aspects, the UE 515 may prioritize reporting the measurements for the cells on SUB 1 that maintain the signal strength delta with respect to the cell of SUB 2 below the signal strength delta.

In one aspect, the UE 515 may be configured to perform the method 500 before entering DSDA mode. For example, the UE 515 may perform the method 500 while in a DSDS mode. In another example, the UE 515 may be configured to perform the method 500 upon entering DSDA mode in response to the primary subscription's signal strength being above a configured threshold.

Figure 6:
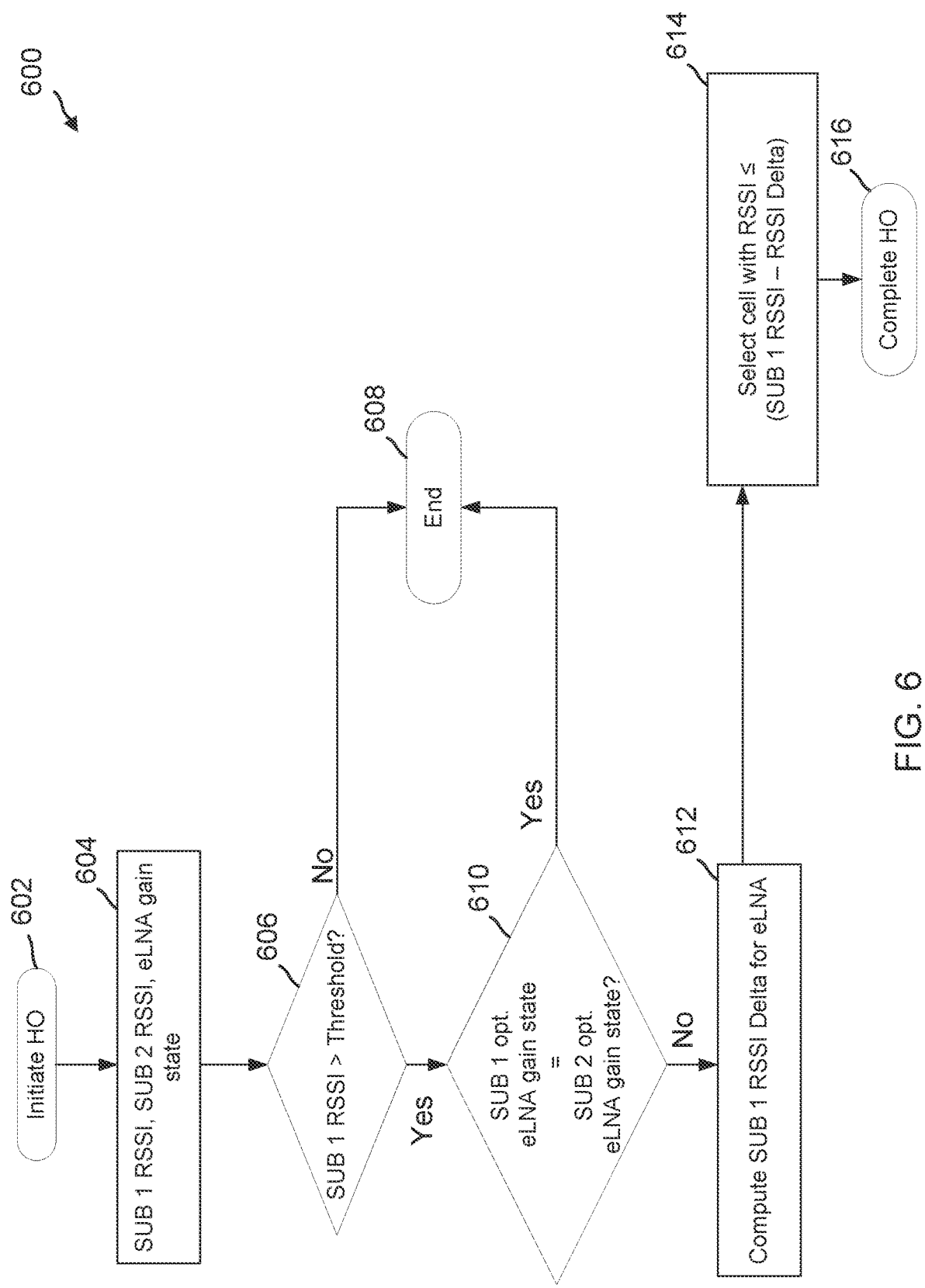
FIG. 6 is a flow diagram of a method for joint cell selection for DSDA operation, according to some aspects of the present disclosure.

FIG. 6 is a flow diagram of a method for joint cell reselection in a DSDA communication scenario. In some aspects, the method 600 may include one or more aspects of the method 500. For example, aspects of the method may be performed by the UE 515 and/or the BS 505. In some aspects, actions 508, 510, and 512 of the method 500 may include one or more aspects of the method 600. In some aspects, the UE performing aspects of the method 600 may be configured with the hardware architecture shown in FIG. 4, for example.

At action 602, the UE initiates a handover procedure, or cell reselection procedure. In some aspects, initiating the handover procedure may be based on a trigger event or condition. In another aspect, the handover may be initiated based on a communication from the network. In some aspects, the handover may be initiated by the network based on cell measurement reports transmitted by the UE.

At action 604, the UE measures the signal strength for SUB 1, the signal strength for SUB 2, and checks the current eLNA gain state. In some aspects, action 604 includes obtaining RSSI measurements, RSRP measurements, RSRQ measurements, and/or SINR measurements, for example. In some aspects, the method 600 includes transmitting a measurement report to the network indicating the signal strength measurements.

At action 606, the UE determines whether the signal strength for SUB 1 is above a configured threshold. In some aspects, the signal strength may be SINR, RSRP, and/or RSSI. For example, if the signal strength for SUB 1 is sufficiently high, the UE may be able to reselect to another cell with lower signal strength with minimal or no effects on performance. If the signal strength is not above the threshold, the UE may terminate, or refrain from initiating, the joint cell reselection method at action 608. In other words, in some aspects, the reselection may only be performed if the signal strength of SUB 1 is more than a threshold. For example, if the signal strength of SUB 1 exceeds a predetermined threshold, the reduction in signal strength of SUB 1 may not cause an appreciable degradation in network performance or user experience. In some aspects, action 606 may be based on a service type of SUB 1. Service types may include voice, SMS, MMS, data, ultra-reliable low latency communications (URLLC), and/or any other suitable service type. For example, if the service type if voice, the allocated resources may be relatively thin such that the signal strength may be affected less by reselecting to a different cell. If the service type is data, the UE may terminate, or refrain from initiating, the handover procedure. In some aspects, action 606 is based on a combination of the signal strength of SUB 1, the signal strength threshold, and the service type of SUB 1 and/or SUB 2.

At action 610, the UE determines an optimal or preferred eLNA gain state for the SUB 1 cell, and an optimal eLNA gain state for the SUB 2 cell. If the optimal eLNA gain states for SUB 1 and SUB 2 are the same, the UE may terminate the joint cell reselection method at action 608. If the optimal eLNA gain states are different, the UE may proceed with computing a signal strength delta for SUB 1. In this regard, the signal strength delta may refer to the range of signal strength (e.g., RSSI, RSRP) for which the current eLNA gain state of SUB 1 is optimal or preferred. In other words, any serving cell within the signal strength delta of the current SUB 1 serving cell would use the same eLNA gain state.

At action 612, the UE may proceed with obtaining cell measurements for SUB 1 of one or more neighboring cells at action 612. In some aspects, the one or more neighboring cells may be indicated in a conditional handover (CHO) configuration. In other aspects, the UE may perform a cell search procedure to identify the one or more neighboring cells.

At action 614, the UE selects a cell having a signal strength that is lower than SUB 1's current serving cell by at least the signal strength delta.

At action 616, the UE completes the handover procedure for the selected cell from action 614. In some aspects, based on the handover, the UE may update the eLNA gain state based on SUB 1's newly selected cell from action 614. In some aspects, updated eLNA gain state for the newly selected cell may mitigate any impact on SUB 1's performance while potentially improving performance on SUB 2 since the eLNA gain state may be more suitable or optimal for SUB 2 than the previous eLNA gain state. In some aspects, the eLNA gain state may be updated using an automatic gain control (AGC) mechanism.

FIG. 7 is a block diagram of an exemplary UE 700 according to some aspects of the present disclosure. The UE 700 may be a UE 115 or UE 215 as discussed above in FIGS. 1A-2 and may conform to the hardware architecture described above with respect to FIG. 3. As shown, the UE 700 may include a processor 702, a memory 704, a Multi-SIM module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to a UE 115, 215 in connection with aspects of the present disclosure, for example, aspects of FIGS. 5 and 6. Instructions 706 may also be referred to as code, which may include any type of computer-readable statements.

The Multi-SIM module 708 may be implemented via hardware, software, or combinations thereof. For example, the Multi-SIM module 708 may be implemented as a processor, circuit, and/or instructions 706 stored in the memory 704 and executed by the processor 702.

In some aspects, the Multi-SIM module 708 may include multiple SIMs or SIM cards (e.g., 2, 3, 4, or more) similar to the SIMs 210. Each SIM may be configured to store information used for accessing a network, for example, to authenticate and identify the UE 700 as a subscriber of the network. Some examples of information stored on a SIM may include, but not limited to, a subscriber identity such as an international mobile subscriber identity (IMSI) and/or information and/or key used to identify and authenticate the UE 700 in a certain provider network. In some aspects, the UE 700 may have a first subscription on a first SIM of the multiple SIMs and a second subscription on a second SIM of the multiple SIMs. The first subscription may identify the UE 700 by a first subscriber identity, and the second subscription may identify the UE 700 by a second subscriber identity.

In some aspects, the functionality described above with respect to FIGS. 5 and 6 may be included as logic within Multi-SIM module 708. In other aspects, the functionality may be included in another component, such as in computer readable code within instructions 706 in memory 704. In some aspects, the Multi-SIM module 708 may be configured to perform one or more aspects of a joint cell selection procedure for DSDA operation, as explained above. For example, the Multi-SIM module 708 may be configured to perform, for a first subscription, a first handover from a first cell to a second cell; and perform, for a second subscription, a second handover from a third cell to a fourth cell. In some aspects, the performing the first handover and/or the performing the second handover may be based on a difference in signal strength between the first cell and the third cell exceeding a threshold. For example, the threshold may be based on or associated with a signal strength delta or range of an eLNA gain state of the first subscription. In another aspect, the performing the first handover and/or performing the second handover may be based on a difference in signal strength between the second cell and the fourth cell may be equal to or less than the threshold.

As shown, the transceiver 710 may include the modem subsystem 712 and the RF unit 714. The transceiver 710 can be configured to communicate bi-directionally with other devices, such as the BSs 105 and 205. The modem subsystem 712 may be configured to modulate and/or encode the data from the memory 704 and the Multi-SIM module 708 according to a modulation and coding scheme (MCS), e.g., a low-density parity check (LDPC) coding scheme, a turbo coding scheme, a convolutional coding scheme, a digital beamforming scheme, etc. In some aspects, the transceiver 710 may include the hardware architecture shown in FIG. 4, for example. For example, the transceiver 710 may include, for each of a plurality of antenna ports, an eLNA and signal splitting circuitry for splitting the amplified signal from the eLNA into to receive signal paths. The RF unit 714 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 714 may be further configured to perform analog beamforming in conjunction with digital beamforming. Although shown as integrated together in transceiver 710, the modem subsystem 712 and the RF unit 714 may be separate devices that are coupled together at the UE 700 to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., RRC configurations, MIB, PDSCH data and/or PDCCH DCIs, etc.) to the Multi-Sim module 708 for processing. The antennas 716 may include multiple antennas of similar or different designs in order to sustain multiple transmission links.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
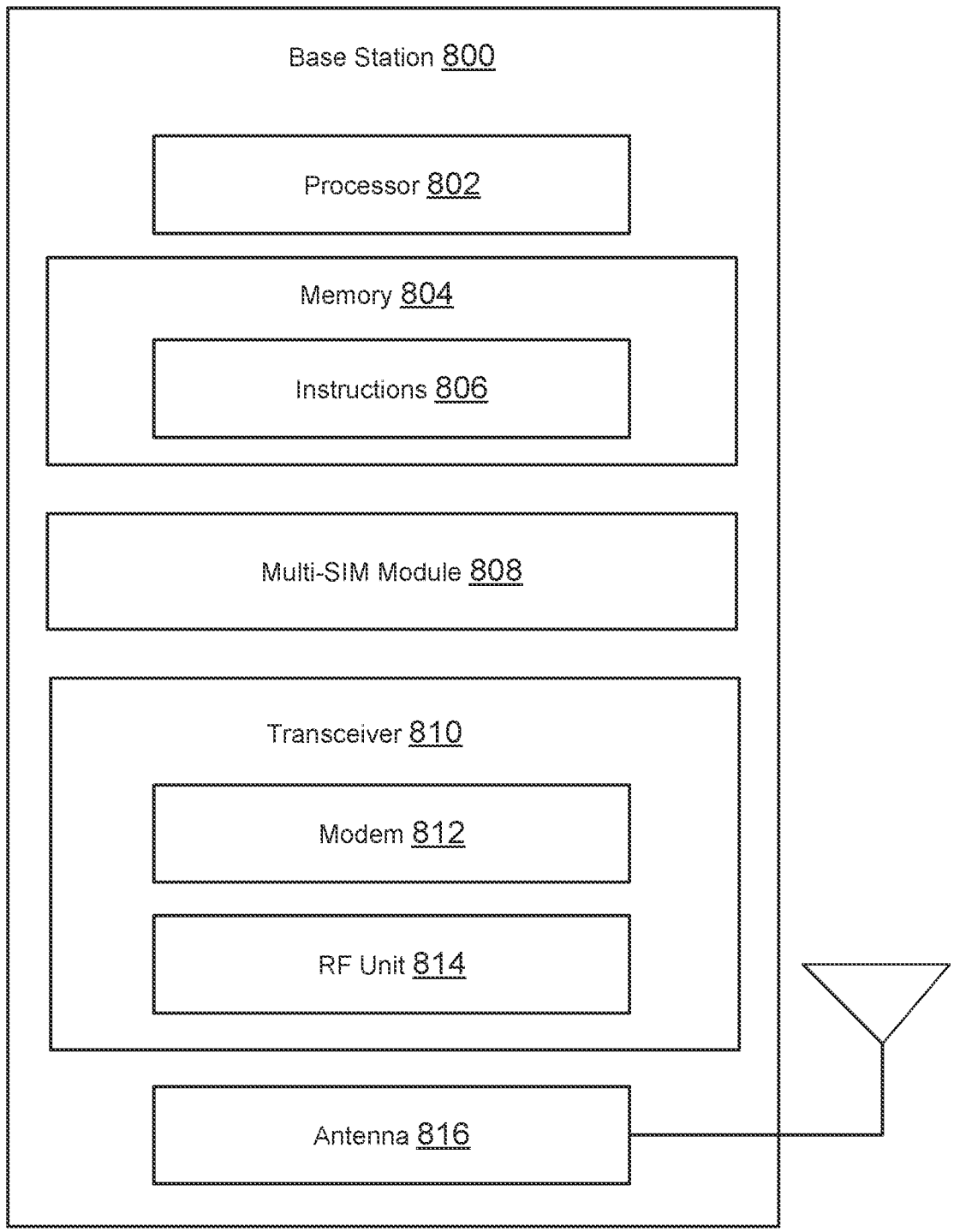
FIG. 8 illustrates a block diagram of a base station (BS) according to some aspects of the present disclosure.

FIG. 8 is a block diagram of an exemplary BS 800 according to some aspects of the present disclosure. The BS 800 may be a BS 105 or a BS 205 as discussed in FIGS. 1A and 2. As shown, the BS 800 may include a processor 802, a memory 804, a Multi-SIM module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 5 and 6. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Multi-SIM module 808 may be implemented via hardware, software, or combinations thereof. For example, the Multi-SIM module 808 may be implemented as a processor, circuit, and/or instructions 806 stored in the memory 804 and executed by the processor 802. In some examples, the Multi-SIM module 808 can be integrated within the modem subsystem 812. For example, the Multi-SIM module 808 can be implemented by a combination of software components (e.g., executed by a DSP or a general processor) and hardware components (e.g., logic gates and circuitry) within the modem subsystem 812. The Multi-SIM module 808 may communicate with one or more components of BS 800 to implement various aspects of the present disclosure, for example, aspects of FIGS. 5 and 6.

In some aspects, the Multi-SIM module 808 may be configured to perform one or more aspects of a joint cell selection procedure for DSDA operation, as explained above. For example, the Multi-SIM module 808 may be configured to determine, based on cell measurements obtained by a UE, whether to initiate a cell reselection or handover procedure. In some aspects, the cell measurements may include cell measurements for a first subscription and a second subscription, and the Multi-SIM module 808 may determine whether to initiate the cell reselection based on a difference in signal strength between the first SUB and the second SUB exceeding a first threshold. For example, the first threshold may be based on or associated with a signal strength delta or range of an eLNA gain state of the first subscription. In another aspect, the initiating the first handover and/or the second handover may be based on the signal strength of the first SUB exceeding a second threshold. For example, the second threshold may be a configured signal strength threshold.

As shown, the transceiver 810 may include the modem subsystem 812 and the RF unit 814. The transceiver 810 can be configured to communicate bi-directionally with other devices, such as the UEs 115, 215 and/or BS 800 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 812 (on outbound transmissions) or of transmissions originating from another source such as a UE 115, 215, and/or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., PUSCH data, PUCCH UCI, MSG1, MSG3, etc.) to the Multi-SIM module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
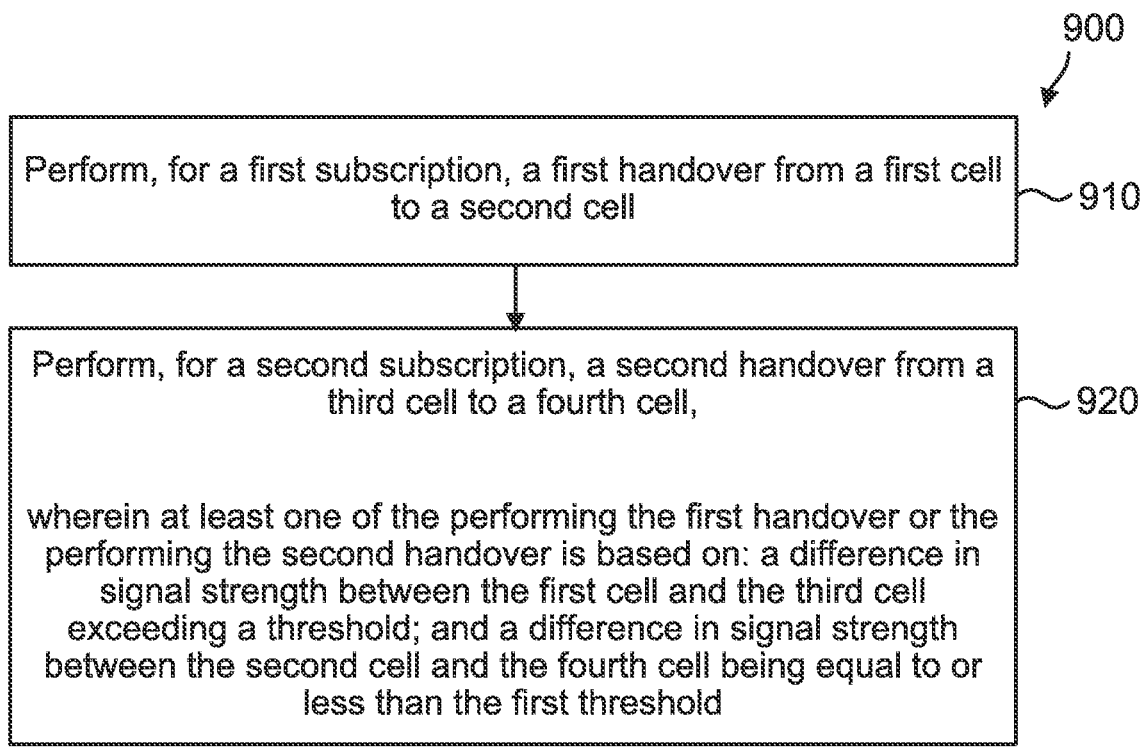
FIG. 9 is a flow diagram of a method for joint cell selection for DSDA operation, according to some aspects of the present disclosure.

FIG. 9 is a flowchart of a method 900 for joint cell selection in an MSIM communication scenario, according to some aspects of the present disclosure. The method 900 may be performed by UE, such as UE 115 (FIG. 1), UE 215 (FIG. 2), UE 515 (FIG. 5), and/or UE 700 (FIG. 7). The UE performing the method 900 may include an array of antennas associated with one or more antenna ports. In an exemplary aspects, the UE may be associated with four antenna ports. Further, the UE may be configured for MIMO operation. In one example, the UE may include 4 antenna ports, and may be configured for 4×4 MIMO operation. As illustrated, the method 900 includes a number of enumerated actions, but aspects of the method 900 may include additional actions before, after, and in between the enumerated actions. In some aspects, one or more of the enumerated actions may be omitted or performed in a different order.

At action 910, the UE performs, for a first subscription, a first handover from a first cell to a second cell. In some aspects, performing the first handover comprises obtaining cell measurements for one or more neighboring cells, and selecting one of the neighboring cells based on the cell measurements. In some aspects, obtaining the cell measurements includes obtaining RSSI measurements, RSRP measurements, RSRQ measurements, and/or SINR measurements. In some aspects, performing the first handover comprises transmitting one or more measurement reports to a network device, such as a BS. In some aspects, the first handover may also include receiving, from the network device, an RRC reconfiguration. In some aspects, the first subscription may be a primary subscription, which may also be referred to as a default subscription, and/or DDS.

At action 920, the UE performs, for a second subscription, a second handover from a third cell to a fourth cell. In some aspects, performing the second handover comprises obtaining cell measurements for one or more neighboring cells, and selecting one of the neighboring cells based on the cell measurements. In some aspects, obtaining the cell measurements includes obtaining RSSI measurements, RSRP measurements, RSRQ measurements, and/or SINR measurements. In some aspects, performing the second handover comprises transmitting one or more measurement reports to a network device, such as a BS. In some aspects, the second handover may also include receiving, from the network device, an RRC reconfiguration. In some aspects, the second subscription may be a secondary subscription, which may also be referred to as a non-default subscription, and/or n-DDS.

In some aspects, at least one of the performing the first handover or the performing the second handover may be based on a difference in signal strength between the first cell and the third cell exceeding a threshold. For example, in some aspects, the threshold may be based on a signal strength delta or range associated with an optimal or preferred eLNA gain state for the first subscription. For example, the difference in signal strength between the first cell and the third cell may exceed the threshold if the difference in signal strength between the first cell and the third cell is greater than the signal strength range or delta associated with the optimal eLNA gain state. Accordingly, in some aspects, at least one of the performing the first handover or the second handover may be based on whether the first cell and the third cell have different optimal or preferred eLNA gain states.

Example Aspects of the Present Disclosure

Further aspects of the present disclosure include the following clauses:

Aspect 1. A method of wireless communication performed by a user equipment (UE), the method comprising: performing, for a first subscription, a first handover from a first cell to a second cell; and performing, for a second subscription, a second handover from a third cell to a fourth cell, wherein at least one of the performing the first handover or the performing the second handover is based on: a difference in signal strength between the first cell and the third cell exceeding a first threshold; and a difference in signal strength between the second cell and the fourth cell being equal to or less than the first threshold.

Aspect 2. The method of aspect 1, wherein the at least one of the performing the first handover or the performing the second handover is based on a gain state of a low noise amplifier (LNA) for the first cell being different from a gain state of the LNA for the third cell, wherein the LNA is shared between the first subscription and the second subscription.

Aspect 3. The method of any of aspects 1-2, wherein a signal strength of the second cell is less than a signal strength of the first cell by at least a first amount.

Aspect 4. The method of aspect 3, wherein the first amount is based on the first threshold, and wherein the first threshold is based on a signal strength range of an optimal gain state of a low noise amplifier for the second cell, wherein the LNA is shared between the first subscription and the second subscription.

Aspect 5. The method of any of aspects 1-4, wherein the at least one of the performing the first handover or the performing the second handover is based on: a conditional handover (CHO) configuration; and signal strength measurements for a plurality of cells indicated in the CHO configuration.

Aspect 6. The method of any of aspects 1-5, further comprising: obtaining signal strength measurements associated with a plurality of cells, wherein the plurality of cells comprises at least one of the third cell or the fourth cell; and transmitting, to a network unit, at least one signal strength measurement report indicating the signal strength measurements associated with plurality of cells.

Aspect 7. The method of aspect 6, wherein the transmitting the at least one signal strength measurement report is based on a difference in signal strength between the first cell and each cell of the plurality of cells.

Aspect 8. The method of any of aspects 1-7, wherein: the performing the first handover and the performing the second handover comprises performing the first handover and performing the second handover in a dual receive dual-sim dual-standby (DR-DSDS) mode; and the method further comprises initiating a dual-sim dual active (DSDA) mode after the performing the first handover and the performing the second handover.

Aspect 9. The method of any of aspects 1-7, further comprising: initiating a dual-sim dual active (DSDA) mode, wherein the performing the first handover and the performing the second handover comprises performing the first handover and performing the second handover in response to initiating the DSDA mode.

Aspect 10. The method of any of aspects 1-9, wherein: the first subscription is associated with a first priority; the second subscription is associated with a second priority lower than the first priority; the performing the first handover is based on a signal strength of the first subscription exceeding a second threshold.

Aspect 11. The method of any of aspects 1-10, wherein: the performing the first handover is based on a service type of the first subscription.

Aspect 12. A user equipment (UE), comprising: a processor; and a transceiver in communication with the processor, wherein the UE is configured to perform the actions of any of aspects 1-11.

Aspect 23. A non-transitory, computer-readable medium having program code recorded thereon, wherein the program code comprises instructions executable by a processor of a user equipment (UE) to cause the UE to perform the actions of any of aspects 1-11.

Aspect 30. A user equipment (UE), comprising means for performing the actions of any of aspects 1-11.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   performing, for a first subscription, a first handover from a first cell to a second cell; and
   performing, for a second subscription, a second handover from a third cell to a fourth cell,
   wherein at least one of the performing the first handover or the performing the second handover is based on:
      a difference in signal strength between the first cell and the third cell exceeding a first threshold; and
      a difference in signal strength between the second cell and the fourth cell being equal to or less than the first threshold.

2. The method of claim 1, wherein the at least one of the performing the first handover or the performing the second handover is based on a gain state of a low noise amplifier (LNA) for the first cell being different from a gain state of the LNA for the third cell, wherein the LNA is shared between the first subscription and the second subscription.

3. The method of claim 1, wherein a signal strength of the second cell is less than a signal strength of the first cell by at least a first amount.

4. The method of claim 3, wherein the first amount is based on the first threshold, and wherein the first threshold is based on a signal strength range of an optimal gain state of a low noise amplifier for the second cell, wherein the LNA is shared between the first subscription and the second subscription.

5. The method of claim 1, wherein the at least one of the performing the first handover or the performing the second handover is based on:
   a conditional handover (CHO) configuration; and
   signal strength measurements for a plurality of cells indicated in the CHO configuration.

6. The method of claim 1, further comprising:
   obtaining signal strength measurements associated with a plurality of cells, wherein the plurality of cells comprises at least one of the third cell or the fourth cell; and
   transmitting, to a network unit, at least one signal strength measurement report indicating the signal strength measurements associated with plurality of cells.

7. The method of claim 6, wherein the transmitting the at least one signal strength measurement report is based on a difference in signal strength between the first cell and each cell of the plurality of cells.

8. The method of claim 1, wherein:
   the performing the first handover and the performing the second handover comprises performing the first handover and performing the second handover in a dual receive dual-sim dual-standby (DR-DSDS) mode; and
   the method further comprises initiating a dual-sim dual active (DSDA) mode after the performing the first handover and the performing the second handover.

9. The method of claim 1, further comprising:
   initiating a dual-sim dual active (DSDA) mode,
   wherein the performing the first handover and the performing the second handover comprises performing the first handover and performing the second handover in response to initiating the DSDA mode.

10. The method of claim 1, wherein:
    the first subscription is associated with a first priority;

the second subscription is associated with a second priority lower than the first priority;
the performing the first handover is based on a signal strength of the first subscription exceeding a second threshold.

11. The method of claim 1, wherein:
the performing the first handover is based on a service type of the first subscription.

12. A user equipment (UE), comprising:
a processor; and
a transceiver in communication with the processor, wherein the UE is configured to:
perform, for a first subscription, a first handover from a first cell to a second cell; and
perform, for a second subscription, a second handover from a third cell to a fourth cell,
wherein the UE is configured to perform at least one of the first handover or the second handover based on:
a difference in signal strength between the first cell and the third cell exceeding a first threshold; and
a difference in signal strength between the second cell and the fourth cell being equal to or less than the first threshold.

13. The UE of claim 12, wherein the at least one of the performing the first handover or the performing the second handover is based on a gain state of a low noise amplifier (LNA) for the first cell being different from a gain state of the LNA for the third cell, wherein the LNA is shared between the first subscription and the second subscription.

14. The UE of claim 12, wherein a signal strength of the second cell is less than a signal strength of the first cell by at least a first amount.

15. The UE of claim 14, wherein the first amount is based on the first threshold, and wherein the first threshold is based on a signal strength range of an optimal gain state of a low noise amplifier for the second cell, wherein the LNA is shared between the first subscription and the second subscription.

16. The UE of claim 12, the UE is configured to perform at least one of the first handover or the second handover further based on:
a conditional handover (CHO) configuration; and
signal strength measurements for a plurality of cells indicated in the CHO configuration.

17. The UE of claim 12, wherein the UE is further configured to:
obtain signal strength measurements associated with a plurality of cells, wherein the plurality of cells comprises at least one of the third cell or the fourth cell; and
transmit, to a network unit, at least one signal strength measurement report indicating the signal strength measurements associated with plurality of cells.

18. The UE of claim 17, wherein the UE is configured to transmit the at least one signal strength measurement report based on a difference in signal strength between the first cell and each cell of the plurality of cells.

19. The UE of claim 12, wherein:
the UE is configured to perform the first handover in a dual receive dual-sim dual-standby (DR-DSDS) mode; and
the UE is further configured to initiate a dual-sim dual active (DSDA) mode after performing the first handover and the performing the second handover.

20. The UE of claim 12, wherein the UE is further configured to:
initiate a dual-sim dual active (DSDA) mode,
wherein the UE is configured to perform the first handover and the second handover in response to initiating the DSDA mode.

21. The UE of claim 12, wherein:
the first subscription is associated with a first priority;
the second subscription is associated with a second priority lower than the first priority;
the UE is configured to perform the first handover based on a signal strength of the first subscription exceeding a second threshold.

22. The UE of claim 12, wherein:
the UE is configured to perform the first handover based on a service type of the first subscription.

23. A non-transitory, computer-readable medium having program code recorded thereon, wherein the program code comprises instructions executable by a processor of a user equipment (UE) to cause the UE to:
perform, for a first subscription, a first handover from a first cell to a second cell; and
perform, for a second subscription, a second handover from a third cell to a fourth cell,
wherein the instructions configured to cause the UE to perform at least one of the first handover or the second handover are based on:
a difference in signal strength between the first cell and the third cell exceeding a first threshold; and
a difference in signal strength between the second cell and the fourth cell being equal to or less than the first threshold.

24. The non-transitory, computer-readable medium of claim 23, wherein the at least one of the performing the first handover or the performing the second handover is based on a gain state of a low noise amplifier (LNA) for the first cell being different from a gain state of the LNA for the third cell, wherein the LNA is shared between the first subscription and the second subscription.

25. The non-transitory, computer-readable medium of claim 23, wherein:
a signal strength of the second cell is less than a signal strength of the first cell by at least a first amount;
the first amount is based on the first threshold; and
the first threshold is based on a signal strength range of an optimal gain state of a low noise amplifier for the second cell, wherein the LNA is shared between the first subscription and the second subscription.

26. The non-transitory, computer-readable medium of claim 23, wherein the program code further comprises instructions configured to cause the UE to:
obtain signal strength measurements associated with a plurality of cells, wherein the plurality of cells comprises at least one of the third cell or the fourth cell; and
transmit, to a network unit, at least one signal strength measurement report indicating the signal strength measurements associated with plurality of cells, wherein the instructions configured to cause the UE to transmit the at least one signal strength measurement report are based on a difference in signal strength between the first cell and each cell of the plurality of cells.

27. The non-transitory, computer-readable medium of claim 23, wherein:
the instructions configured to cause the UE to perform the first handover comprise instructions configured to cause the UE to perform the first handover in a dual receive dual-sim dual-standby (DR-DSDS) mode; and
the program code further comprises instructions configured to cause the UE to initiate a dual-sim dual active (DSDA) mode after performing the first handover and the performing the second handover.

28. The non-transitory, computer-readable medium of claim 23, wherein the program code further comprises instructions configured to cause UE to:
    initiate a dual-sim dual active (DSDA) mode; and
    perform the first handover and the second handover in response to initiating the DSDA mode.

29. The non-transitory, computer-readable medium of claim 23, wherein:
    the first subscription is associated with a first priority;
    the second subscription is associated with a second priority lower than the first priority;
    the UE is configured to perform the first handover based on at least one of:
        a signal strength of the first subscription exceeding a second threshold; or
        a service type of the first subscription.

30. A user equipment (UE), comprising:
    means for performing, for a first subscription, a first handover from a first cell to a second cell; and
    means for performing, for a second subscription, a second handover from a third cell to a fourth cell,
    wherein at least one of the means for performing the first handover or the means for performing the second handover is based on:
        a difference in signal strength between the first cell and the third cell exceeding a first threshold; and
        a difference in signal strength between the second cell and the fourth cell being equal to or less than the first threshold.

* * * * *